US011800881B2

United States Patent
Wang et al.

(10) Patent No.: US 11,800,881 B2
(45) Date of Patent: Oct. 31, 2023

(54) SPHERICAL PUFFING PUMP FOR ICE CREAM MACHINE AND AIR INLET DEVICE THEREOF

(71) Applicant: SHENZHEN SPHERICAL FLUID POWER TECHNOLOGY CO., LTD., Guangdong (CN)

(72) Inventors: Luyi Wang, Shenzhen (CN); Wuxing Zhang, Shenzhen (CN)

(73) Assignee: SHENZHEN SPHERICAL FLUID POWER TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/965,677

(22) Filed: Oct. 13, 2022

(65) Prior Publication Data

US 2023/0029836 A1 Feb. 2, 2023

Related U.S. Application Data

(63) Continuation of application No. PCT/CN2021/087727, filed on Apr. 16, 2021.

(30) Foreign Application Priority Data

Apr. 18, 2020 (CN) .......................... 202010308665.4
Jun. 29, 2020 (CN) .......................... 202010607928.1

(51) Int. Cl.
*A23G 9/20* (2006.01)
*A23G 9/22* (2006.01)
*F04B 15/02* (2006.01)

(52) U.S. Cl.
CPC ................. *A23G 9/20* (2013.01); *A23G 9/22* (2013.01); *F04B 15/02* (2013.01)

(58) Field of Classification Search
CPC .... A23G 9/04; A23G 9/20; A23G 9/22; F04B 43/04; F04B 15/02; F04B 53/16
See application file for complete search history.

(56) References Cited

U.S. PATENT DOCUMENTS

| 3,816,039 A | * | 6/1974 | Berry | ...................... F04C 18/54 |
| | | | | 418/68 |
| 5,433,084 A | * | 7/1995 | Kaiser | ................. B01F 25/4331 |
| | | | | 261/DIG. 75 |
| 10,975,869 B2 | * | 4/2021 | Juan | .......................... F01C 3/08 |

FOREIGN PATENT DOCUMENTS

| CN | 206821892 U | 1/2018 |
| CN | 110671319 A | 1/2020 |
| CN | 111374213 A | 7/2020 |
| CN | 111622916 A | 9/2020 |

(Continued)

*Primary Examiner* — Reginald Alexander

(57) ABSTRACT

A spherical puffing pump for an ice cream machine and an air inlet device thereof. The spherical puffing pump includes a spherical pump body, a clamping plate and an air inlet valve. A liquid feeding hole of the spherical pump body is connected to a milk slurry tank to feed milk slurry. The air inlet valve is connected to a channel of the liquid feeding hole to introduce air. A liquid discharging hole is connected to a liquid inlet of a refrigerating cylinder. A pump seat is fixed on the ice cream machine. An end portion of the pump seat protrudes from an inner wall of the tank. A cylinder of the spherical pump body is connected to the end portion through the clamping plate. A main shaft of the spherical pump body is connected to a motor shaft through a connecting shaft for power transmission.

6 Claims, 11 Drawing Sheets

(56) References Cited

FOREIGN PATENT DOCUMENTS

CN           212116933 U    12/2020
WO    WO-2018188242 A1 * 10/2018  ............... A23G 9/04

* cited by examiner

SPHERICAL PUFFING PUMP FOR ICE CREAM MACHINE AND AIR INLET DEVICE THEREOF

CROSS-REFERENCE TO RELATED APPLICATIONS

This application is a continuation of International Patent Application No. PCT/CN2021/087727, filed on Apr. 16, 2021, which claims the benefit of priority from Chinese Patent Applications No. 202010308665.4, filed on Apr. 18, 2020, No. 202010607928.1, field on Jun. 29, 2020. The content of the aforementioned applications, including any intervening amendments thereto, is incorporated herein by reference in its entirety.

TECHNICAL FIELD

This application relates to food machine, and more particularly to a spherical puffing pump for an ice cream machine and an air inlet device thereof.

BACKGROUND

Puffing pump is an important component of the ice cream machine. Most of the commercially-available ice cream machines adopt a built-in puffing pump. From the perspective of food hygiene, the puffing pump needs to be removed from the ice cream machine and cleaned after the end of operation. Therefore, a puffing pump with simple structure and convenient removal and cleaning is preferred. At present, the frequently-used puffing pumps for ice cream machines include gear pumps, piston pumps, and peristaltic pumps, and although these pumps are structurally different, they all play a role in achieving the puffing of air and ice cream liquid raw materials.

The piston pump has the advantages of simple structure, easy detachment and washing, and low cost. However, after fed into the piston pump, the ice cream milk slurry experiences reciprocating movement under the frequency of about 40-50 times per minute, and in this case, the sucked air fails to be uniformly mixed with the milk slurry, thereby influencing the puffing efficiency of the milk slurry, and the operation efficiency of the ice cream machine. Additionally, the air inlet of the piston pump is prone to be blocked, resulting in the pump blocking. The gear puffing pump has a simple structure and good puffing rate, but the cavitation may occur on the plastic gear, and result in peeling, causing the problems of food hygiene and safety.

Recently, the suction-type ice cream machine has been widely applied in the market. While sucking the raw material, a certain amount of air will also be introduced, which will not only bring good taste, but also increase the puffing rate of ice cream milk slurry, so as to enhance the quality of ice cream products, and improve the economic benefit. Unfortunately, both of the gear pump and the peristaltic pump have poor self-priming ability, and fails to suck the milk slurry from the tank into the pump body, and thus it is necessary to add an auxiliary pump or place the slurry tank above the pump.

SUMMARY

An objective of this application is to provide a spherical puffing pump for an ice cream machine, which has simple structure, convenient removal and cleaning, and strong self-priming ability, and enables the uniform mixing of the milk slurry.

Another objective of this application is to provide an air inlet device of the spherical puffing pump for the ice cream machine, which is installed on a liquid feeding channel of the spherical puffing pump, so as to prevent the liquid from spraying out from the air inlet during operation.

Technical solutions of this application are described as follows.

In a first aspect, this application provides a spherical puffing pump for an ice cream machine, comprising:
a spherical pump body;
a clamping plate; and
an air inlet valve;
wherein a liquid feeding hole of the spherical pump body is communicated with a milk slurry tank to feed milk slurry; the air inlet valve is connected to a liquid feeding channel communicated with the liquid feeding hole to introduce air; a liquid discharging hole of the spherical pump body is communicated with a liquid inlet of a refrigerating cylinder of the ice cream machine; a pump seat is fixedly provided on the ice cream machine; an end portion of the pump seat protrudes from an inner wall of the milk slurry tank; a cylinder of the spherical pump body is mechanically connected to the end portion of the pump seat through the clamping plate; and a main shaft of the spherical pump body is mechanically connected to a motor shaft in the ice cream machine through a connecting shaft for power transmission.

In a second aspect, this application provides an air inlet device of a spherical puffing pump for an ice cream machine, comprising:
an air inlet pipe; and
an anti-spray seat;
wherein the air inlet pipe is communicated with a liquid feeding hole of the spherical puffing pump through the anti-spray seat; the anti-spray seat is provided with an upper straight hole, a lower straight hole and a connecting hole; the upper straight hole is a blind hole provided on an upper end surface of the anti-spray seat, and the lower straight hole is a blind hole provided on a lower end surface of the anti-spray seat; the upper straight hole is communicated with the lower straight hole through the connecting hole; the lower straight hole is communicated with a liquid feeding channel of the liquid feeding hole, and the upper straight hole is communicated with the air inlet pipe; and a lower end of the connecting hole is provided on an inner wall at a middle of the lower straight hole, and an upper end of the connecting hole is provided on a wall at a lower end of the upper straight hole.

Compared with the prior art, this application has the following beneficial effects.

The spherical puffing pump provided herein has simple structure and convenient removal and cleaning. In use, the puffing rate can be adjusted by varying the size of the air inlet and the motor rotating speed, so as to fully mix the air with the milk slurry. Moreover, the spherical puffing pump provided herein has strong self-primping ability, which facilitates the arrangement of the milk slurry tank.

Regarding the air inlet device provided herein, it can prevent the milk slurry from spraying out from the air inlet during operation. In addition, the air inlet device provided herein is simple in structure, and easy to remove and clean. It is also convenient to replace the air inlet pipe, and the size of the air inlet pipe and the motor rotating speed can be regulated to adjust the puffing rate.

BRIEF DESCRIPTION OF THE DRAWINGS

Embodiments of this application will be described in detail below with reference to the accompanying drawings.

Figure 1:
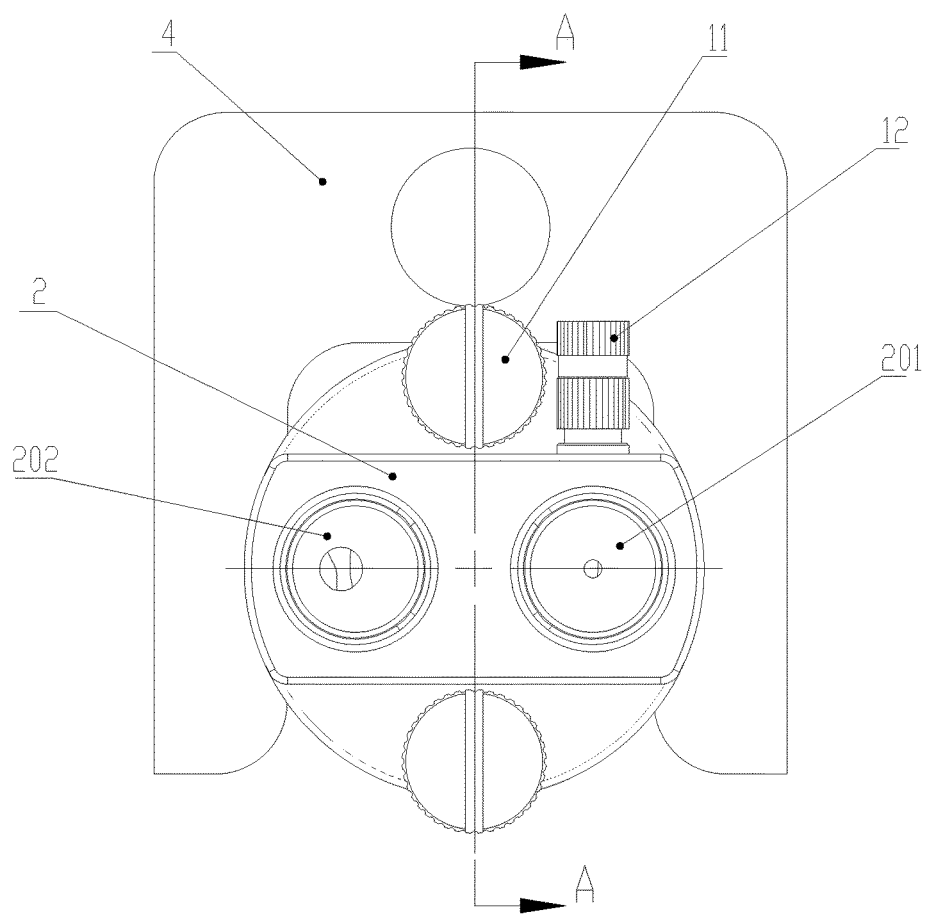
FIG. 1 is a front view of a spherical puffing pump according to an embodiment of the present disclosure.
Figure 2:
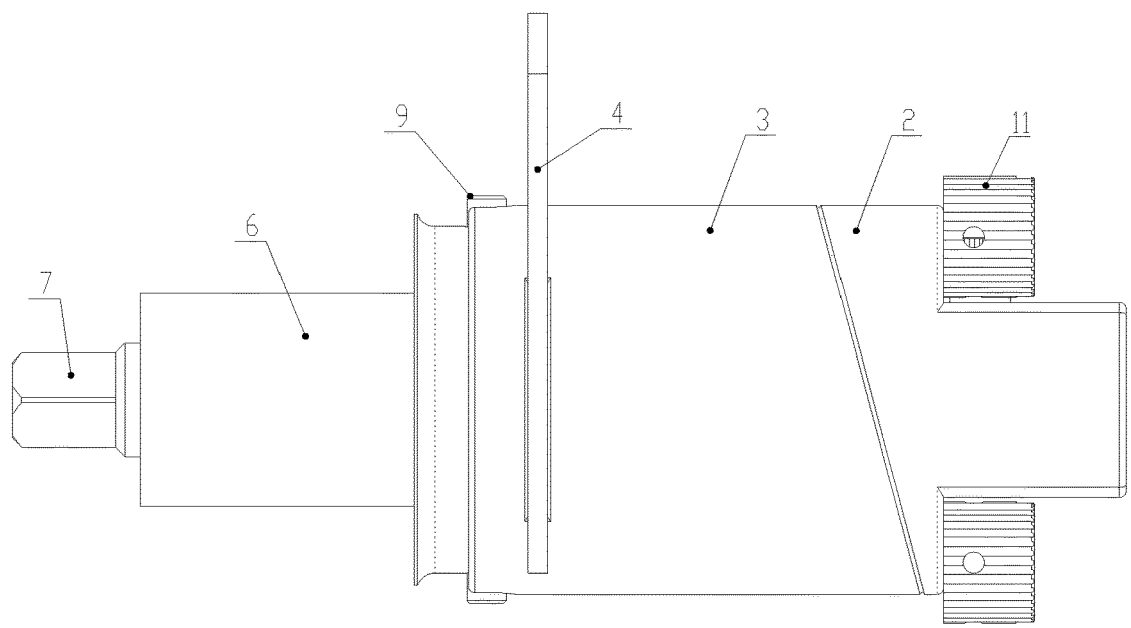
FIG. 2 is a left-side view of the spherical puffing pump according to an embodiment of the present disclosure.
Figure 3:
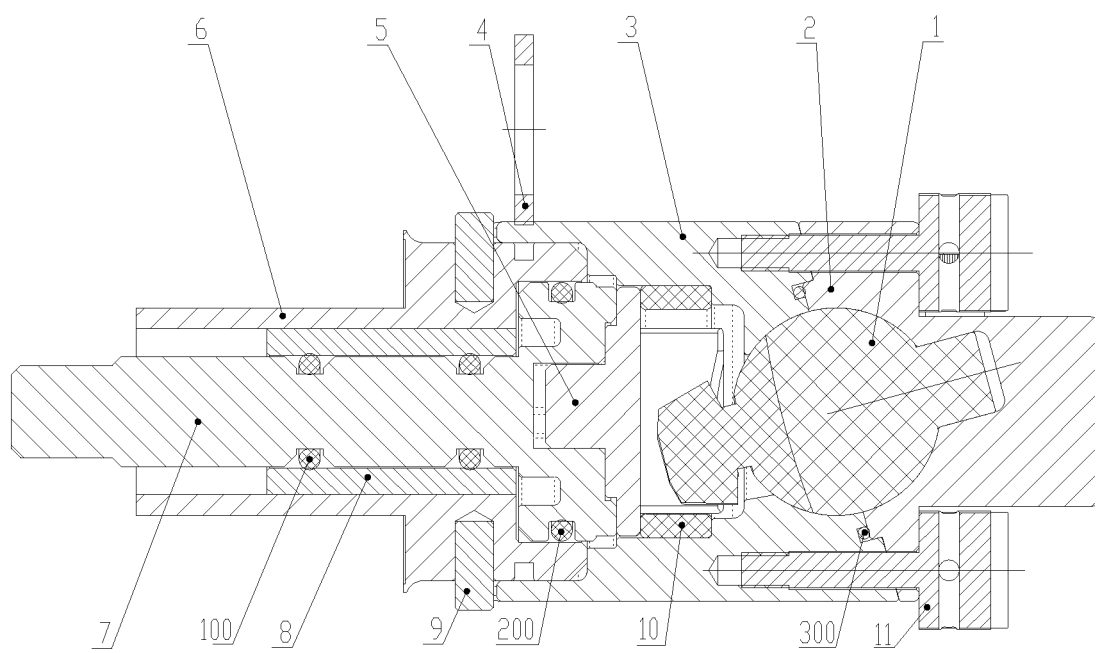
FIG. 3 is a sectional view of the spherical puffing pump along line A-A in FIG. 1.
Figure 4:
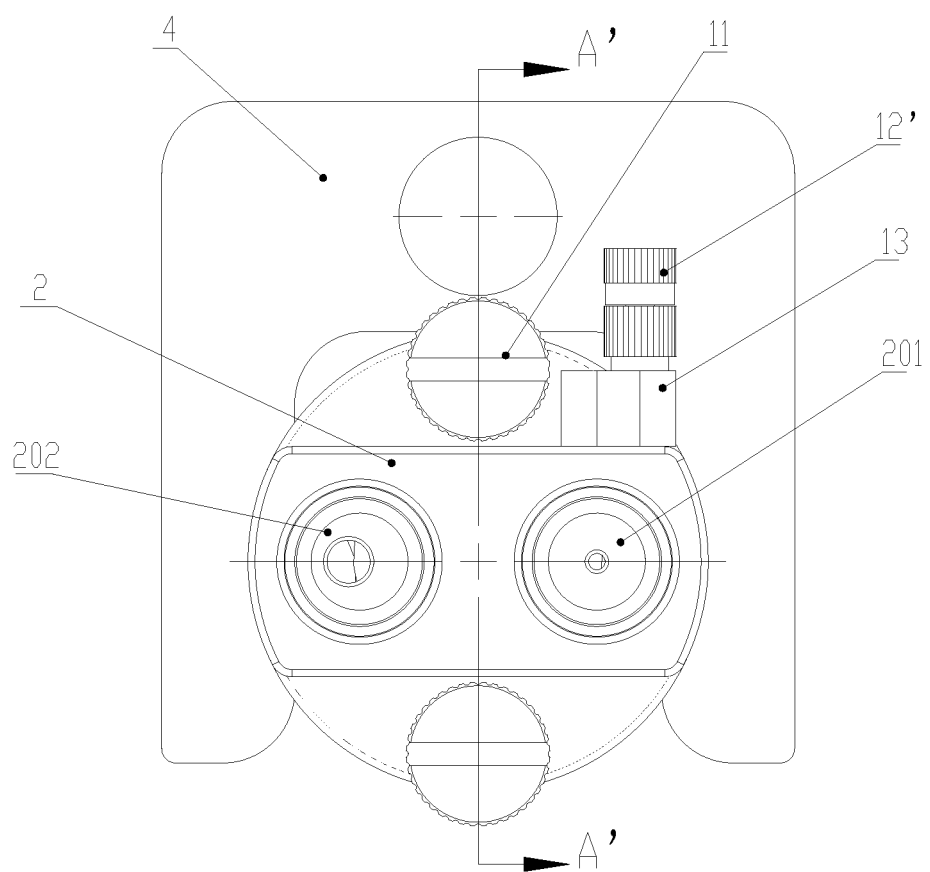
FIG. 4 is a front view of a spherical puffing pump according to another embodiment of the present disclosure.

In the drawings, 1: rotor; 2: cylinder head; 3: cylinder; 4: clamping plate; 5: main shaft; 6: pump seat; 7: connecting shaft; 8: shaft sleeve; 8': bearing; 9: cylindrical pin; 10: cylinder sleeve; 11: knurled screw; 12: air inlet valve; 12': air inlet pipe; 13: anti-spray seat;

101: piston; 1011: piston shaft; 1012: first pin boss; 102: rotating plate; 1021: slipper; 1022: second pin boss; 201: liquid feeding hole; 202: liquid discharging hole; 203: liquid feeding groove; 204: liquid discharging groove; 205: piston shaft hole; 301: clamping groove; 302: U-shaped pin hole; 401: operating hole; 501: cylindrical shaft head; 502: triangular shaft head; 503: chute; 601: annular groove; 602: pin hole; 701: triangular shaft hole; 111: cross hole; 112: slotted groove; 131: lower straight hole; 132: upper straight hole; 133: connecting hole; and

100: first seal ring; 200: second seal ring; and 300: third seal ring.

DETAILED DESCRIPTION OF EMBODIMENTS

In order to make the technical solutions, objectives and beneficial effects clearly understood, this application will be described in detail below with reference to the accompanying drawings and embodiments.

Embodiment 1

Figure 9:
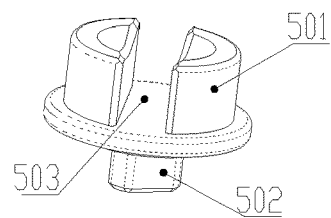
FIG. 9 is a structural diagram of a main shaft according to an embodiment of the present disclosure.
Figure 16:
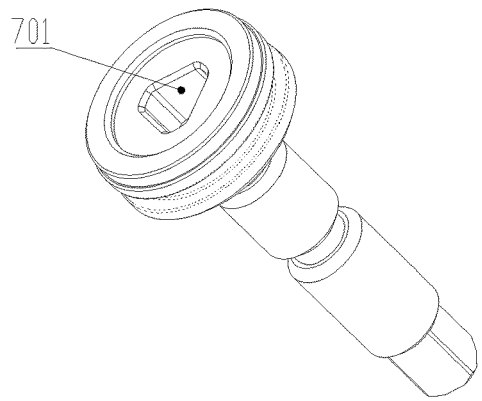
FIG. 16 is a structural diagram of a motor connecting shaft according to an embodiment of the present disclosure.

Referring to FIGS. 1-3 and 6-8, a spherical puffing pump for an ice cream machine is provided, which includes a spherical pump body, a clamping plate 4 and an air inlet valve 12. A liquid feeding hole 201 of the spherical pump body is communicated with a milk slurry tank to feed milk slurry. The air inlet valve 12 is connected to a liquid feeding channel communicated with the liquid feeding hole 201 to introduce air. The air inlet valve 12 is configured to adjust the volume of the air introduced in the pump. A liquid discharging hole 202 of the spherical pump body is communicated with a liquid inlet of a refrigerating cylinder of the ice cream machine. A motor of the ice cream pump is placed in the ice cream machine. The pump seat 6 is fixedly provided on the ice cream machine. An end portion of the pump seat 6 protrudes from an inner wall of the milk slurry tank (that is, the milk slurry tank is filled with the ice cream raw material slurry, or other liquid ingredients) of the ice cream machine. The spherical pump body housing is mechanically connected to the end portion of the pump seat 6 through the clamping plate 4. A main shaft 5 of the spherical pump body is mechanically connected to a motor shaft in the ice cream machine through a connecting shaft 7 for power transmission. As shown in FIGS. 9 and 16, a lower end of the main shaft 5 is provided with a triangular shaft head 502, and an upper end of the main shaft 5 is a cylindrical shaft head 501. A chute 503 is provided in a center of an end surface of the cylindrical shaft head 501. An outer end of the connecting shaft 7 is provided with a triangular shaft hole 701 matched with the triangular shaft head 502. The connecting shaft 7 is mechanically connected to the motor shaft at an end of the ice cream machine for power transmission. The triangular shaft head 502 at a lower end of the main shaft 5 is inserted into the triangular shaft hole 701 of the connecting shaft 7, so as to transmit the power generated from the motor to the main shaft 5. The motor is configured to drive the main shaft 5 to rotate. A cylinder sleeve 10 is provided between the cylindrical shaft head 501 and a shaft hole at a lower end of the cylinder 3. A shaft sleeve 8 is provided between a middle shaft of the connecting shaft 7 and a shaft hole of the pump seat 6, so as to rotatably support of the shaft system.

Figure 10:
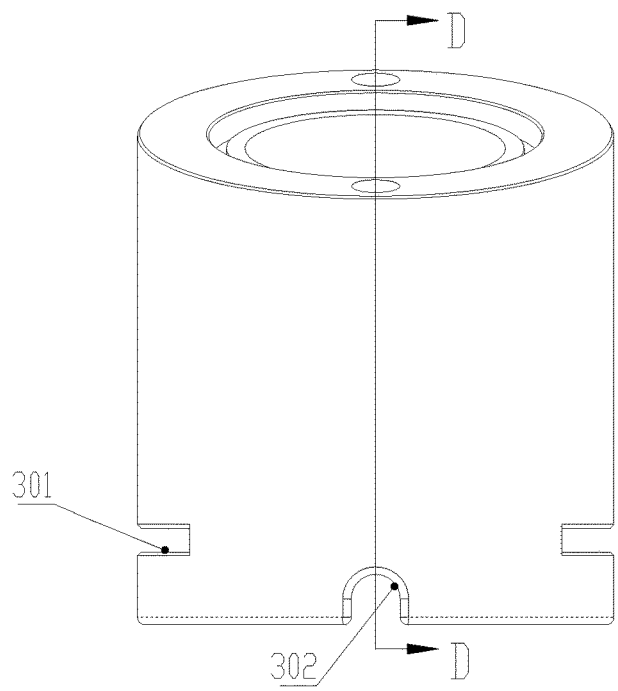
FIG. 10 is a structural diagram of a cylinder according to an embodiment of the present disclosure.
Figure 11:
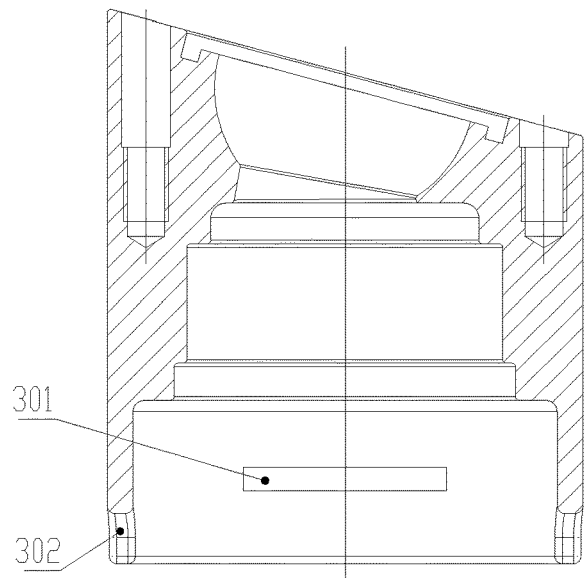
FIG. 11 is a sectional view of the cylinder along line D-D in FIG. 10.
Figure 18:
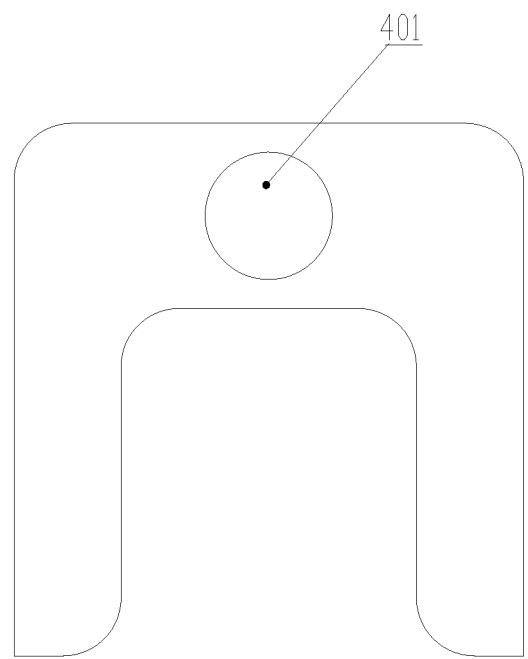
FIG. 18 is a structural diagram of a clamping plate according to an embodiment of the present disclosure.
Figure 19:
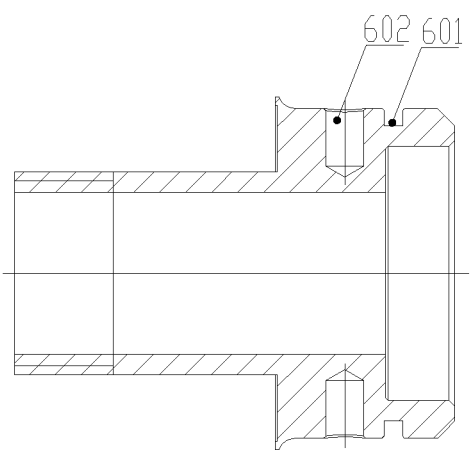
FIG. 19 is a structural diagram of a pump seat according to an embodiment of the present disclosure.
Figure 20:
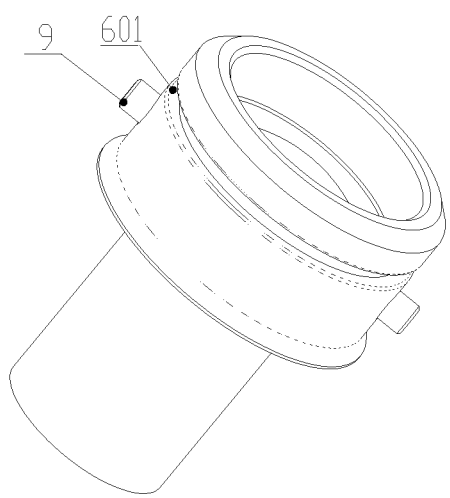
FIG. 20 schematically shows a connection structure between the pump seat and a cylindrical pin according to an embodiment of the present disclosure.

As shown in FIGS. 19-20, an outer circumference of the end portion of the pump seat 6 protruding from the ice cream machine is fixedly provided with two pin holes 602 and an annular groove 601. Two cylindrical pin 9 are insertedly fixed into the two pin holes 602. The two cylindrical pins 9 are symmetrically arranged on the outer circumference of the end portion of the pump seat 6 and protrude from the outer circumference. As shown in FIGS. 10-11, a lower end surface of the cylinder 3 is provided with two U-shaped pin holes 302 corresponding to the two cylindrical pins 9. The diameter of each of the two U-shaped pin holes 302 matches the diameter of each of the two cylindrical pins 9. Two sides of an outer circumference of the cylinder 3 are each provided with a clamping groove 301 corresponding to the annular groove 601. The two clamping grooves 301 at two sides of the cylinder 3 radially penetrate through the side wall of the cylinder 3 and are arranged in parallel. The triangular shaft head 502 at a lower end of the main shaft 5 is inserted into the triangular shaft hole 701 of the connecting shaft 7. The two U-shaped pin holes 302 provided on the lower end surface of the cylinder 3 are respectively clamped into the two cylindrical pins 9 to radially fix the spherical pump body on the pump seat 6. As shown in FIG. 18, the clamping plate 4 has a U-shaped structure. Two U-shaped inner sides of the clamping plate 4 are respectively clamped into the clamping groove 301 on each of two sides of the cylinder 3 and the annular groove 601 on the circumference of the pump seat 6 to axially fix the spherical pump body on the pump seat 6. The clamping plate 4 is provided with an operating hole 401, so as to facilitate the detachment of the clamping plate 4 by using the hand or tool for clamping.

Figure 17:
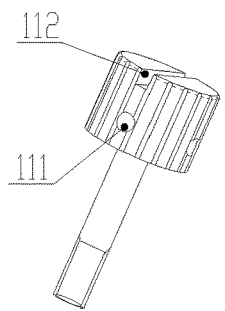
FIG. 17 is a structural diagram of a knurled screw according to an embodiment of the present disclosure.

The spherical pump body includes the cylinder 3, a cylinder head 2, a piston 101, a rotating plate 102 and the main shaft 5. The piston 101 is hingedly connected to the rotating plate 102 to form a rotor 1. As shown in FIGS. 6-8 and 10-11, the cylinder 3 has a first hemispherical inner cavity and the cylinder head 2 has a second hemispherical inner cavity. The cylinder 3 is connected to the cylinder head 2 by a knurled screw 11 to form a spherical inner cavity. An inner spherical surface of the cylinder head 2 is provided a piston shaft hole 205, a liquid feeding groove 203 and a liquid discharging groove 204. The liquid feeding groove 203 is communicated with the liquid feeding hole 201, and the liquid discharging groove 204 is communicated with the liquid discharging hole 202. The first hemispherical inner cavity and the second hemispherical inner cavity have the same sphere center. An upper flange surface of cylinder 3 is fitted with a lower flange surface of cylinder head 2. Both the upper flange surface of cylinder 3 and the lower flange surface of cylinder head 2 are inclined planes that pass through the sphere center of the spherical inner cavity, facilitating the assembly and detachment of the rotor 1. The lower flange surface of cylinder head 2 is provided with screw passing holes, and the upper flange surface of cylinder 3 is provided with corresponding screw holes. The cylinder 3 is connected to the cylinder head 2 by the knurled screw 11. As shown in FIG. 17, a head portion of the knurled screw 11 is circumferentially provided with a cross hole 111. A top surface of the head portion of the knurled screw 11 is provided with a slotted groove 112. The head portion of the knurled screw 11 is circumferentially provided with a knurled pattern. When assembling and disassembling, the rod tool is quickly inserted into the cross hole 111 to tighten or loosen the knurled screw 11, or slotted screwdriver is inserted into the slotted groove 112 to tighten or loosen the knurled screw 11, facilitating the selection of the tools.

Referring to FIGS. 12-15, the piston 101 has a spherical top surface and two sides. A piston shaft 1011 is provided in a center of the spherical top surface, and a lower end of each of the two sides of the piston 101 is provided with a first pin boss 1012. The rotating plate 102 has a spherical surface. A rotating plate shaft is provided on a center of a lower part of the spherical surface. A lower end of the rotating plate shaft is provided with a slipper 1021. An upper end of the spherical surface is provided with a second pin boss 1022. The first pin boss 1012 is a semi-cylinder protruding from the lower end of the piston 101. A central axis of the semi-cylinder is perpendicular to an axis of the piston shaft 1011, and passes through the sphere center of the piston spherical surface. The two ends of the semi-cylinder are piston spherical surfaces. The second pin boss 1022 is a semi-cylindrical hole with an upward opening. The central axis of the semi-cylindrical hole is perpendicular to the axis of the rotating plate shaft. The semi-cylindrical hole matches the semi-cylindrical body. The semi-cylinder of the first pin boss 1012 is inserted into the semi-cylindrical hole of the second pin boss 1022 to form a C-shaped cylindrical hinge. The slipper 1021 at the end of the rotary shaft is inserted in the chute 503 at the upper end of the main shaft 5 to form a chute swing mechanism. The two sides of the slipper 1021 and the two sides of the chute 503 are laminated, and in a sliding fit. An axis of the main shaft 5 and an axis of the piston shaft 1011 form an included angle and both pass through a center of the spherical inner cavity. The piston shaft 1011 is insertedly provided in the piston shaft hole 205. The piston 101 is hingedly connected to the rotating plate 102 to form a rotor 1 through a cylindrical hinge. The piston 101 has a spherical top surface, and the rotating plate 102 has a spherical surface. The spherical top surface of the piston, the spherical surface of the rotating plate and the spherical inner cavity have the same sphere center, and are in seal movable fit. Fitting surfaces of the cylindrical hinge are in seal movable fit with each other. The main shaft is configured to drive the rotating plate 102 to rotate through the connecting shaft 7. The piston 101 and the rotating plate 102 are configured to swing relative to each other around the cylindrical hinge. A first working chamber is formed between an upper end surface of the rotating plate, one side of the piston and the spherical inner cavity, and a second working chamber is formed between the upper end surface of the rotating plate, the other side of the piston and the spherical inner cavity. Volumes of the first working chamber and the second working chamber vary alternately. When the rotor is rotating, volumes of the first working chamber and the second working chamber vary alternately, and the rotor is alternately connected to the liquid feeding groove 203 or the liquid discharging groove 204. When the volume of the V1 working chamber increases, the liquid feeding groove 203 is connected to the V1 working chamber for feeding the liquid. When the volume of the V1 working chamber reaches or is close to the maximum value, the liquid feeding groove 203 is disconnected from the V1 working chamber, and the liquid feeding is stopped. After the liquid feeding, the V1 working chamber is compressed, and the volume of the V1 working chamber is reduced. Accordingly, the volume of the V2 working chamber is reduced, and the liquid pressure is increased. When the liquid pressure is increased to the preset pressure, the liquid discharging groove 204 is connected to the V2 working chamber to discharge the high-pressure liquid. When the volume of the V2 working chamber reaches or is close to the minimum value, the liquid discharging groove 204 is disconnected from the V2 working chamber to stop discharging the liquid. After the high-pressure liquid is discharged, the V2 working chamber is expanded. Such working cycle is repeated to complete the liquid compression.

In order to prevent milk leakage, a first seal ring 100 is provided between a middle journal of the connecting shaft 7 and the shaft sleeve 8, and a second seal ring 200 is provided between an outer end journal of the connecting shaft 7 and an inner shaft hole of the pump seat 6. A third seal ring 300 is provided on a connecting surface between the cylinder 3 and cylinder head 2, and the third seal ring 300 has an "O-type" structure.

As fixed components in the ice cream machine, the puffing pump motor, the connecting shaft 7 and the pump seat 6 are generally undetachable. In use, only the main body of the puffing pump is detached and cleaned. The assembling, disassembling and cleaning processes of the puffing pump are performed as follows. When assembling, the triangular shaft head 502 at the lower end of the main shaft 5 of the spherical puffing pump is inserted into the triangular shaft hole 701 at an outer end of the connecting shaft 7, such that the U-shaped pin hole 302 at the lower end of the cylinder 3 is aligned with and clamped into the cylindrical pin 9 on the pump seat 6. Then, the clamping plate 4 is clamped into the clamping groove 301 on the outer circumference of the cylinder 3 to fix the puffing pump on the pump seat 6. When the puffing pump is required to be disassembled and cleaned after use, the clamping plate 4 is drawn out radially from the cylinder 3, and the puffing pump is axially drawn out. Then, the knurled screw 11 on the cylinder head 2 is quickly removed, and the main shaft 5 and rotor 1 are removed after opening the cylinder head 2, and then each component is washed.

Embodiment 2

As a tempting and delicious frozen dairy product, ice cream is popular all over the world due to the crispy and sweet tastes. In order to improve the taste of ice cream, it is necessary to set up a puffing pump in the ice cream machine during the high-end ice cream production process. The puffing pump is configured to mix the prepared ice cream raw material slurry with air, and pressurize and convey the mixture to the refrigerating cylinder. As a newly-developed technology in recent years, spherical pump body is currently entering the industrialization and application promotion stage. As the puffing pump of the ice cream machine, the spherical pump body has significant advantages, such as small scale, light weight, easy cleaning, uniform mixing of air and liquid, high puffing rate. In addition, the puffing rate is allowed to be adjusted according to the requirements of merchants or users. With the continuous improvement of people's demand for ice cream quality, the application share of the spherical puffing pump to be the puffing pump of an ice cream machine will increase.

Since the air inlet of the spherical puffing pump of the ice cream machine is provided on the liquid feeding channel, the feeding liquid and the air suction of the spherical puffing pump are not continuous. In the spherical puffing pump, the compressed air expands between the two air suctions, which will cause the spray of the milk slurry from the air suction inlet. The milk slurry will be sprayed to the outside of the pump body, affecting the production environment of ice cream, and posing the food safety hazards.

Provided herein is an air inlet device of a spherical puffing pump for an ice cream machine, which is installed on a liquid feeding channel of the spherical puffing pump for the ice cream machine.

Figure 21:
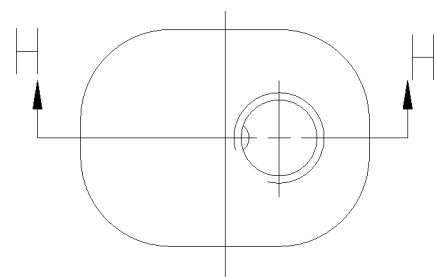
FIG. 21 is a structural diagram of an anti-spray seat according to an embodiment of the present disclosure.
Figure 22:
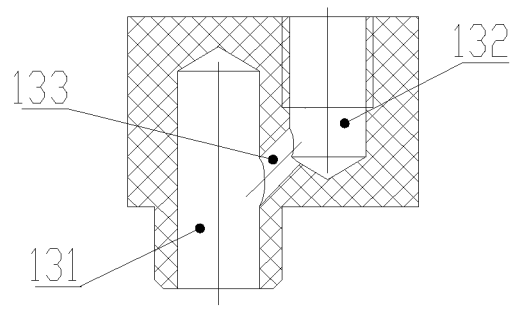
FIG. 22 is a sectional view of the anti-spray seat along line E-E in FIG. 21.

Referring to FIGS. 4-8, the spherical puffing pump for the ice cream machine is installed on a side wall of the ice cream machine through a clamping plate 4. As fixed components in the ice cream machine, the puffing pump motor, the connecting shaft 7 and the pump seat 6 are generally undetachable. In use, only the main body of the puffing pump is detached and cleaned. The puffing pump is a spherical pump body. The liquid feeding hole 201 of the spherical puffing pump is communicated with the milk slurry tank to feed the milk slurry raw material. The air inlet pipe 12' is connected to the liquid feeding channel of the liquid feeding hole 201 to introduce air. An anti-spray seat 13 is provided at a connecting place between the air inlet pipe 12' and the liquid feeding channel of the liquid feeding hole 201. The air inlet pipe 12' is communicated with a liquid feeding hole 201 of the spherical puffing pump through the anti-spray seat 13. Referring to FIGS. 21-22, the anti-spray seat 13 is provided with an upper straight hole 132, a lower straight hole 131 and a connecting hole 133. The upper straight hole 132 is a blind hole provided on an upper end surface of the anti-spray seat 13, and the lower straight hole 131 is a blind hole provided on a lower end surface of the anti-spray seat 13. The upper straight hole 132 and the lower straight hole 131 are arranged in parallel. The upper straight hole 132 is communicated with the lower straight hole 131 through the connecting hole 133. The lower straight hole 131 is communicated with a liquid feeding channel of the liquid feeding hole 201, and the upper straight hole 132 is communicated with the air inlet pipe 12'. The lower straight hole 131 of the anti-spray seat 13 is communicated with a liquid feeding channel of the liquid feeding hole 201, and the upper straight hole 132 of the anti-spray seat is communicated with the air inlet pipe 12'. An axis of the connecting hole 133 and an axis of the lower straight hole 131 form an included angle. The connecting hole 133 is inclined upward. A lower end of the connecting hole 133 is provided on a middle inner wall of the lower straight hole 131, and an upper end of the connecting hole 133 is provided on an inner wall at a lower end of the upper straight hole 132. An upper end of the connecting hole 133 is provided higher than a lower end of the connecting hole 133. The diameter of the connecting hole 133 is smaller than the diameter of the upper straight hole 132 and the diameter of the lower straight hole 131.

The lower end of the anti-spray seat 13 is in interference fit with a wall of the liquid feeding channel of the liquid feeding hole 201. The upper straight hole 132 and the lower straight hole 131 are communicated with the liquid feeding hole 201.

The end of the air inlet pipe 12' connected to the anti-spray seat 13 is provided with an external thread, and the upper straight hole 132 of anti-spray seat 13 is provided with an internal thread. The upper straight hole 132 of the anti-spray seat 13 is connected to the air inlet pipe 12' through the threads. A normally open valve of the air inlet hole is provided at a center of the air inlet pipe 12'. The outer periphery of the air inlet pipe 12' is provided with a knurled pattern for manual installation on the anti-spray seat 13. The air inlet pipes 12' with different inner aperture diameters are replaced, such that the size of the air inlet holes correspondingly changes. The inner aperture size of the air inlet pipes 12' is regulated to adjust the volume of the air introduced into the pump, so as to adjust the puffing rate of the ice cream pump.

Referring to FIGS. 5-8, 9-10, 12, 14-16 and 20-21, a liquid discharging hole 202 of the spherical pump body is connected to a liquid inlet of a refrigerating cylinder of the ice cream machine. A motor of the ice cream pump is placed in the ice cream machine. The pump seat 6 is fixedly provided on the ice cream machine. An end portion of the pump seat 6 protrudes from an inner wall of the milk slurry tank (that is the milk slurry tank is filled with the ice cream raw material slurry, or other liquid ingredients) of the ice cream machine. The spherical pump body housing is mechanically connected to the end portion of the pump seat 6 through the clamping plate 4. The main shaft 5 of the spherical pump body is mechanically connected to a motor shaft in the ice cream machine through the connecting shaft 7 for power transmission. As shown in FIGS. 9 and 16, a lower end of the main shaft 5 of the spherical pump body is provided with a triangular shaft head 502, and an upper end of the main shaft 5 is a cylindrical shaft head 501. A chute 503 is provided in a center of an end surface of the cylindrical shaft head 501. An outer end of the connecting shaft 7 is provided with a triangular shaft hole 701 matched with the triangular shaft head 502. The connecting shaft 7 is mechanically connected to the motor shaft at an end of the ice cream machine for power transmission. The triangular shaft head 502 at a lower end of the main shaft 5 is inserted into the triangular shaft hole 701 of the connecting shaft 7, so as to transmit the power generated from the motor to the main shaft 5. The motor is configured to drive the main shaft 5 to rotate. A cylinder sleeve 10 is provided between the cylindrical shaft head 501 and a shaft hole at a lower end of the cylinder 3. A shaft sleeve 8 is provided between a middle shaft of the connecting shaft 7 and a shaft hole of the pump seat 6, so as to rotatably support of the shaft system.

Figure 5:
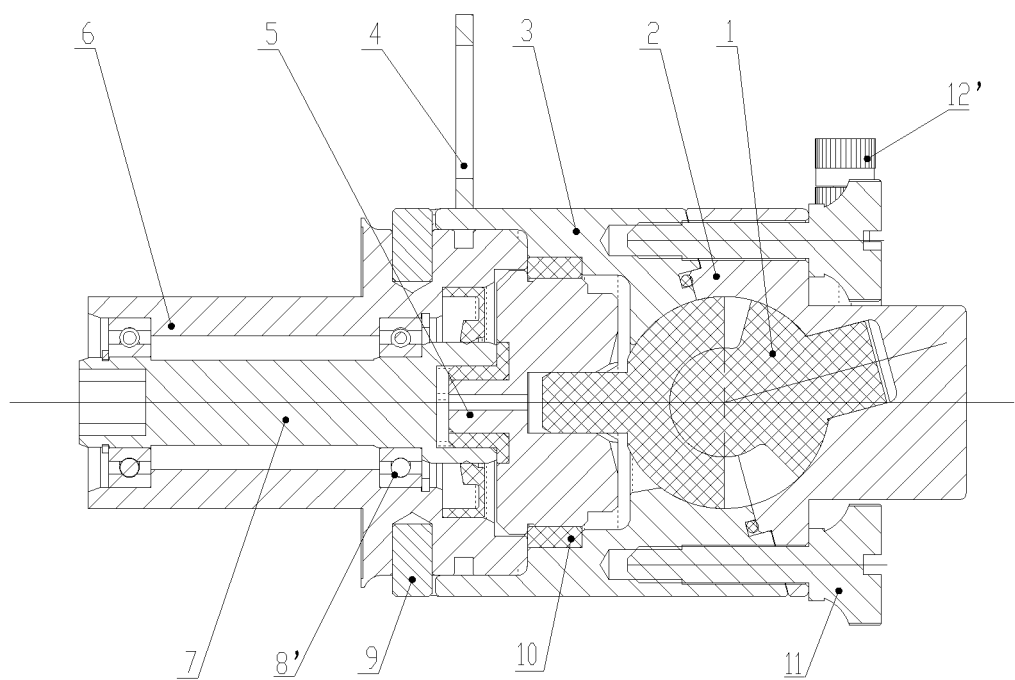
FIG. 5 is a sectional view of the spherical puffing pump along line A'-A' in FIG. 4.
Figure 6:
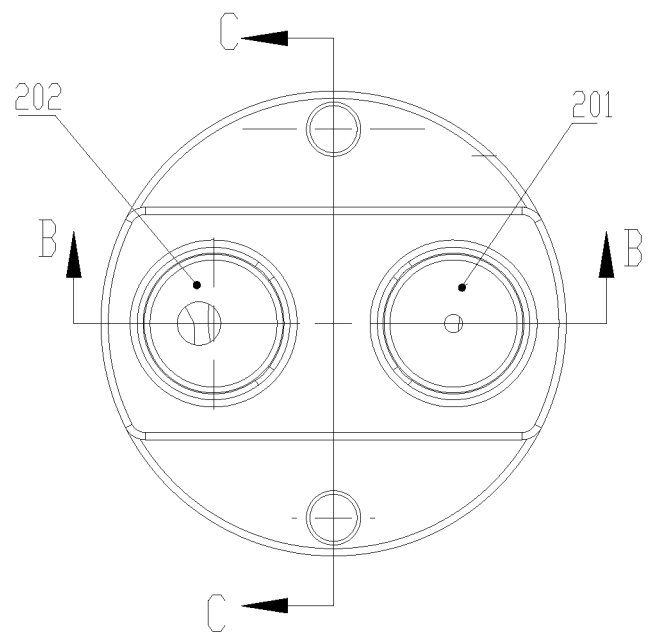
FIG. 6 is a structural diagram of a cylinder head according to an embodiment of the present disclosure.
Figure 7:
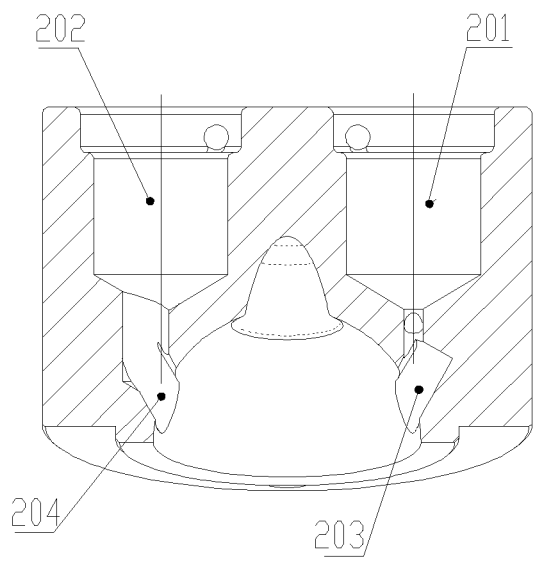
FIG. 7 is a sectional view of the cylinder head along line B-B in FIG. 6.
Figure 8:
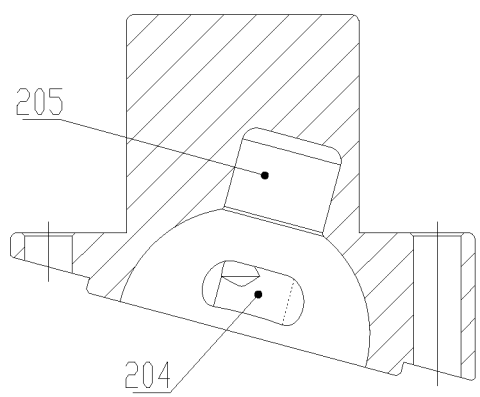
FIG. 8 is a sectional view of the cylinder head along line C-C in FIG. 6.

Referring to FIGS. 20 and 5, an outer circumference of the end portion of the pump seat 6 protruding from the ice cream machine is fixedly provided with two pin holes 602 and an annular groove 601. Two cylindrical pin 9 are insertedly fixed into the two pin holes 602. The two cylindrical pins 9 are symmetrically arranged on the outer circumference of the end portion of the pump seat 6 and protrude from the outer circumference. As shown in FIG. 10, a lower end surface of the cylinder 3 is provided with two U-shaped pin holes 302 corresponding to the two cylindrical pins 9. The diameter of each of the two U-shaped pin holes 302 matches the diameter of each of the two cylindrical pins 9. Two sides of an outer circumference of the cylinder 3 are each provided with a clamping groove 301 corresponding to the annular groove 601. The two clamping grooves 301 at two sides of the cylinder 3 radially penetrate through the side wall of the cylinder 3 and are arranged in parallel. The triangular shaft head 502 at a lower end of the main shaft 5 is inserted into the triangular shaft hole 701 of the connecting shaft 7. The two U-shaped pin holes 302 provided on the lower end surface of the cylinder 3 are respectively clamped into the two cylindrical pins 9 to radially fix the spherical pump body on the pump seat 6. The clamping plate 4 has a U-shaped structure. Two U-shaped inner sides of the clamping plate 4 are respectively clamped into the clamping groove 301 on each of two sides of the cylinder 3 and the annular groove 601 on the circumference of the pump seat 6 to axially fix the spherical pump body on the pump seat 6.

As fixed components in the ice cream machine, the puffing pump motor, the connecting shaft 7 and the pump seat 6 are generally undetachable. In use, only the main body of the puffing pump is detached and cleaned. The assembling, disassembling and cleaning processes of the puffing pump are performed as follows. When assembling, the triangular shaft head 502 at the lower end of the main shaft 5 of the spherical puffing pump is inserted into the triangular shaft hole 701 at an outer end of the connecting shaft 7, such that the U-shaped pin hole 302 at the lower end of the cylinder 3 is aligned with and clamped into the cylindrical pin 9 on the pump seat 6. Then, the clamping plate 4 is clamped into the clamping groove 301 on the outer circumference of the cylinder 3 to fix the puffing pump on the pump seat 6. When the puffing pump is required to be disassembled and cleaned after use, the clamping plate 4 is drawn out radially from the cylinder 3, and the puffing pump is axially drawn out. Then, the knurled screw 11 on the cylinder head 2 is quickly removed, and the main shaft 5 and rotor 1 are removed after opening the cylinder head 2, and then each component is washed.

The spherical pump body includes the cylinder 3, a cylinder head 2, a piston 101, a rotating plate 102 and the main shaft 5. The piston 101 is hingedly connected to the rotating plate 102 to form a rotor 1. As shown in FIGS. 4-8 and 10, the cylinder 3 has a first hemispherical inner cavity and the cylinder head 2 has a second hemispherical inner cavity. The cylinder 3 is connected to the cylinder head 2 by a knurled screw 11 to form a spherical inner cavity. An inner spherical surface of the cylinder head 2 is provided a piston shaft hole 205, a liquid feeding groove 203 and a liquid discharging groove 204. The liquid feeding groove 203 is communicated with the liquid feeding hole 201, and the liquid discharging groove 204 is communicated with the liquid discharging hole 202. The first hemispherical inner cavity and the second hemispherical inner cavity have the same sphere center. An upper flange surface of cylinder 3 is fitted with a lower flange surface of cylinder head 2. Both the upper flange surface of cylinder 3 and the lower flange surface of cylinder head 2 are inclined planes that pass through the sphere center of the spherical inner cavity, facilitating the assembly and detachment of the rotor 1. The lower flange surface of cylinder head 2 is provided with screw passing holes, and the upper flange surface of cylinder 3 is provided with corresponding screw holes. The cylinder 3 is connected to the cylinder head 2 by the knurled screw 11. A head portion of the knurled screw 11 is circumferentially provided with a cross hole A top surface of the head portion of the knurled screw 11 is provided with a slotted groove. The head portion of the knurled screw 11 is circumferentially provided with a knurled pattern. When assembling and disassembling, the rod tool is quickly inserted into the cross hole to tighten or loosen the knurled screw 11, or slotted screwdriver is inserted into the slotted groove to tighten or loosen the knurled screw 11, facilitating the selection of the tools.

Figure 12:
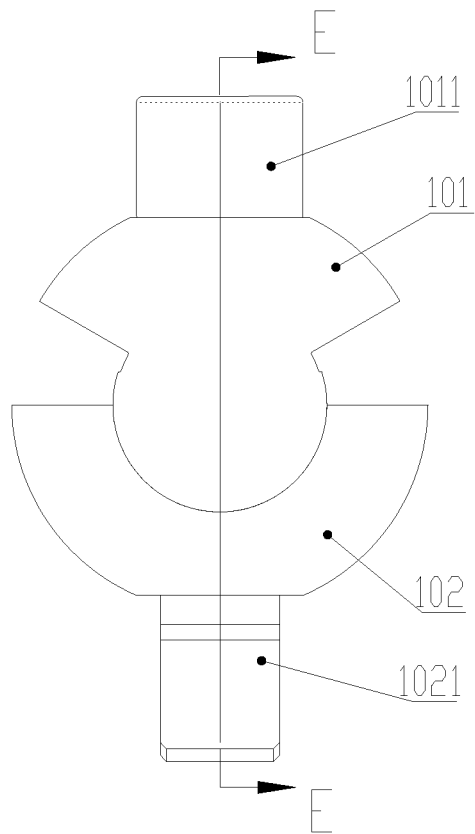
FIG. 12 is a structural diagram of a rotor according to an embodiment of the present disclosure.
Figure 13:
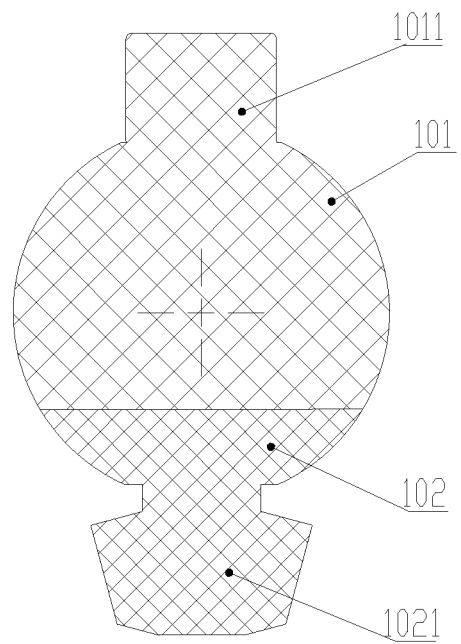
FIG. 13 is a sectional view of the rotor along line E-E direction in FIG. 12.
Figure 14:
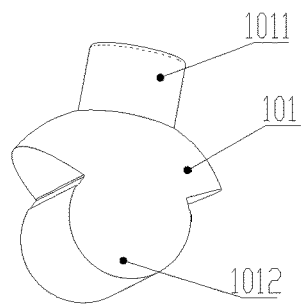
FIG. 14 is a structural diagram of a piston according to an embodiment of the present disclosure.
Figure 15:
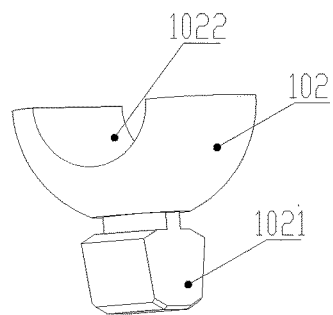
FIG. 15 is a structural diagram of a rotating plate according to an embodiment of the present disclosure.

Referring to FIGS. 12, 14 and 15, the piston 101 has a spherical top surface and two sides. A piston shaft 1011 is provided in a center of the spherical top surface, and a lower end of each of the two sides of the piston 101 is provided with a first pin boss 1012. The rotating plate 102 has a spherical surface. A rotating plate shaft is provided on a center of a lower part of the spherical surface. A lower end of the rotating plate shaft is provided with a slipper 1021. An upper end of the spherical surface is provided with a second pin boss 1022. The first pin boss 1012 is a semi-cylinder protruding from the lower end of the piston 101. A central axis of the semi-cylinder is perpendicular to an axis of the piston shaft 1011, and passes through the sphere center of the piston spherical surface. The two ends of the semi-cylinder are piston spherical surfaces. The second pin boss 1022 is a semi-cylindrical hole with an upward opening. The central axis of the semi-cylindrical hole is perpendicular to the axis of the rotating plate shaft. The semi-cylindrical hole matches the semi-cylindrical body. The semi-cylinder of the first pin boss 1012 is inserted into the semi-cylindrical hole of the second pin boss 1022 to form a C-shaped cylindrical hinge. The slipper 1021 at the end of the rotary shaft is inserted in the chute 503 at the upper end of the main shaft 5 to form a chute swing mechanism. The two sides of the slipper 1021 and the two sides of the chute 503 are laminated, and in a sliding fit. An axis of the main shaft 5 and an axis of the piston shaft 1011 form an included angle and both pass through a center of the spherical inner cavity. The piston shaft 1011 is insertedly provided in the piston shaft hole 205. The piston 101 is hingedly connected to the rotating plate 102 to form a rotor 1 through a cylindrical hinge. The piston 101 has a spherical top surface, and the rotating plate 102 has a spherical surface. The spherical top surface of the piston, the spherical surface of the rotating plate and the spherical inner cavity have the same sphere center, and are in seal movable fit. Fitting surfaces of the cylindrical hinge are in seal movable fit with each other. The main shaft is configured to drive the rotating plate 102 to rotate through the connecting shaft 7. The piston 101 and the rotating plate 102 are configured to swing relative to each other around the cylindrical hinge. A first working chamber is formed between an upper end surface of the rotating plate, one side of the piston and the spherical inner cavity, and a second working chamber is formed between the upper end surface of the rotating plate, the other side of the piston and the spherical inner cavity. Volumes of the first working chamber and the second working chamber vary alternately. When the rotor is rotating, volumes of the first working chamber and the second working chamber vary alternately, and the rotor is alternately connected to the liquid feeding groove 203 or the liquid discharging groove 204. When the volume of the V1 working chamber reaches or is close to the maximum value, the liquid feeding groove 203 is disconnected from the V1 working chamber, and the liquid feeding is stopped. After the liquid feeding, the V1 working chamber is compressed, and the volume of the V1 working chamber is reduced. Accordingly, the volume of the V2 working chamber is reduced, and the liquid pressure is increased. When the liquid pressure is increased to the preset pressure, the liquid discharging groove 204 is connected to the V2 working chamber to discharge the high-pressure liquid. When the volume of the V2 working chamber reaches or is close to the minimum value, the liquid discharging groove 204 is disconnected from the V2 working chamber to stop discharging the liquid. After the high-pressure liquid is discharged, the V2 working chamber is expanded. Such working cycle is repeated to complete the liquid compression.

In order to prevent milk leakage, a first seal ring 100 is provided between a middle journal of the connecting shaft 7 of the motor and the bearing 8', and a second seal ring 200 is provided between an outer end journal of the connecting shaft 7 of the motor and an inner shaft hole of the pump seat 6. A third seal ring 300 is provided on a connecting surface between the cylinder 3 and cylinder head 2, and the third seal ring 300 has an "O-type" structure.

During the rotor rotation process of the spherical puffing pump, the gas-liquid mixture in the gap around the liquid feeding groove 203 is the compressed air. Thus, during the interval between the liquid feeding and the air suction through the liquid feeding hole 201, the compressed air near the liquid feeding groove 203 is sprayed with the liquid from the air inlet pipe 12' through the gap, and the sprayed gas-liquid mixture enters the lower straight hole 131 from the channel of the liquid feeding hole 201. When the gas-liquid mixture in the lower straight hole 131 is sprayed upward to the bottom of the lower straight hole 131, the liquid component is blocked to flow back, and the gas is separated out and enters the upper straight hole 132 through the connecting hole 133, and then escapes from the upper straight hole 132 through the air inlet pipe 12', thereby preventing the liquid from leaking from the air inlet pipe 12'.

Described above are merely exemplary embodiments of this application, which are not intended to limit this application. It should be understood by those skilled in the art that changes and modifications made without departing from the spirit of the application should still fall within the scope of the present application defined by the appended claims. Moreover, it should be understood that the technical features described in the above description may be used along or in combination.

What is claimed is:

1. A spherical puffing pump for an ice cream machine, comprising:
    a spherical pump body;
    a pump seat;
    a connecting shaft;
    a clamping plate; and
    an air inlet valve;
    wherein the spherical pump body comprises a liquid feeding hole, a liquid discharging hole, a cylinder and a main shaft and the liquid feeding hole of the spherical pump body is configured to feed milk slurry;
    the air inlet valve is connected to the liquid feeding hole to introduce air;
    the pump seat is configured to be fixedly provided on the ice cream machine;
    the cylinder of the spherical pump body is mechanically connected to an end portion of the pump seat through the clamping plate; and
    the main shaft of the spherical pump body is mechanically connected to the connecting shaft for power transmission.

2. The spherical puffing pump of claim 1, wherein an outer circumference of the end portion of the pump seat is fixedly provided with a cylindrical pin and an annular groove; a lower end surface of the cylinder is provided with a U-shaped pin hole corresponding to the cylindrical pin; two sides of an outer circumference of the cylinder are each provided with a clamping groove corresponding to the annular groove; the U-shaped pin hole is clamped on the cylindrical pin to radially fix the spherical pump body on the pump seat; and two U-shaped inner sides of the clamping plate are respectively clamped in the clamping groove and the annular groove to axially fix the spherical pump body on the pump seat.

3. The spherical puffing pump of claim 1, wherein the spherical pump body comprises the cylinder, a cylinder head, a piston, a rotating plate and the main shaft; the cylinder and the cylinder head each have a hemispherical inner cavity; the cylinder is connected to the cylinder head by a knurled screw to form a spherical inner cavity; an inner spherical surface of the cylinder head is provided a piston shaft hole, a liquid feeding groove and a liquid discharging groove; the liquid feeding groove is communicated with the liquid feeding hole, and the liquid discharging groove is communicated with the liquid discharging hole, wherein the liquid feeding hole and the liquid discharging hole are both provided on an upper end surface of the cylinder head; a slipper is provided at a lower end of the rotating plate, and is inserted in a chute at an upper end of the main shaft to form a swing mechanism; an axis of the main shaft and an axis of a piston shaft form an included angle, and both pass through a center of the spherical inner cavity; the piston shaft is insertedly provided in the piston shaft hole; the piston is hingedly connected with the rotating plate through a cylindrical hinge to form a rotor; the piston has a spherical top surface, and the rotating plate has a spherical surface; the spherical top surface of the piston, the spherical surface of the rotating plate and the spherical inner cavity have the same sphere center, and are in seal movable fit; fitting surfaces of the cylindrical hinge are in seal movable fit with each other; the main shaft is configured to drive a shaft of the rotating plate to rotate; the piston and the rotating plate are configured to swing relative to each other around the cylindrical hinge; a first working chamber is formed between an upper end surface of the rotating plate, one side of the piston and the spherical inner cavity, and a second working chamber is formed between the upper end surface of the rotating plate, the other side of the piston and the spherical inner cavity; and when a volume of the first working chamber increases, a volume of the second working chamber decreases, and when the volume of the first working chamber decreases, the volume of the second working chamber increases.

4. The spherical puffing pump of claim 3, wherein a head portion of the knurled screw is circumferentially provided with a cross hole; a top surface of the head portion of the knurled screw is provided with a slotted groove; and the head portion of the knurled screw is circumferentially provided with a knurled pattern.

5. The spherical puffing pump of claim 1, wherein a lower end of the main shaft is provided with a triangular shaft head; a first end of the connecting shaft is configured to be provided in the ice cream machine for power transmission; a second end of the connecting shaft is provided with a triangular shaft hole matched with the triangular shaft head; and the triangular shaft head is inserted into the triangular shaft hole.

6. The spherical puffing pump of claim 1, wherein the clamping plate is provided with an operating hole.

\* \* \* \* \*